Patented May 9, 1933

1,908,515

UNITED STATES PATENT OFFICE

KONRAD KELLER, OF DORTMUND-EVING, GERMANY

TREATING THIOCYANATE SOLUTIONS

No Drawing. Application filed November 10, 1928, Serial No. 318,603, and in Germany December 6, 1927.

My invention refers to the purification of solutions containing thiocyanates, more especially such as result in the treatment of coal gases and more especially coke oven gases, and to the recovery of the ammonium thyiocyanate therefrom.

As is well known to those skilled in the art, solutions containing thiocyanates, which result for instance in different processes for removing hydrocyanic acid from coke oven gases, still contain further quantities of other sulphur compounds, such as for instance ammonium polysulfide $(NH_4)_2S_x$ and ammonium thiosulfate $(NH_4)_2S_2O_3$. When solutions of this kind are further treated for the recovery of solid ammonium thiocyanate, this product will still contain considerable quantities of thiosulfate and sulphur, whereby it is often rendered unfit for use.

In order now to remove these sulphur compounds before crystallization of the ammonium thiocyanate, I treat the solutions in question with sulfuric acid, whereby the thiosulfate for instance is decomposed in a well known manner into ammonium sulfate, sulphur and sulphur dioxide according to the equation

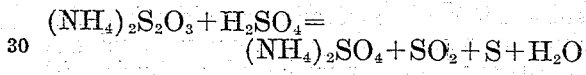

and the polysulfide into ammonium sulfate, sulphur and hydrogen sulfide according to the equation

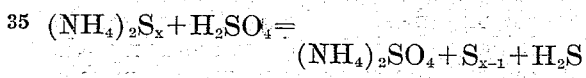

In these reactions the ammonium thiocyanate is not decomposed.

Preferably care should be taken that the sulfuric acid is introduced into the solution gradually in small quantities under stirring and the quantity of sulfuric acid according to the impurities to be decomposed, should not be unduly exceeded.

I further prefer introducing into the solution together with the sulfuric acid a current of air, not only in order to obtain a quick and intimate mixing by the mechanical action of the air, but also in order to remove from the solution as quickly as possible the gaseous decomposition products.

In order to recover from the solution so treated pure ammonim thiocyanate, it is necessary to remove the sulfate formed in the reaction. This can be effected for instance in a well known manner by acting on the solution with lime or baryta according to the equation

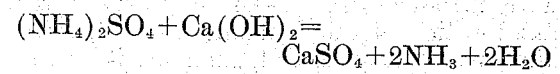

In this manner the impurities can be removed from the impure ammonium thiocyanate solutions in a very simple manner.

Obviously the above steps are indicated only by way of example, the expert being free to vary the conditions of operation in accordance with the requirements of each individual case. The operations may be carried out at ordinary or elevated temperatures. If desired, the solution acted upon may be concentrated either before or during the process.

Example 1

1000 litres of a solution of ammonium sulfocyanate obtained by washing crude coke oven gas at about 25° C. with a suspension of sulphur in dilute ammonia liquor and containing for instance; 295,0 kilograms $NH_4CNS$, 15,0 kilograms $(NH_4)_2S_2O_3$, 4,5 kilograms $(NH_4)_2S_3$, 19,6 kilograms, $NH_3$, 10,5 kilograms S, are placed in an enameled kettle provided with a cover having openings for the introduction of sulfuric acid, compressed air and a thermometer, and an outlet pipe for the waste gases. In this kettle a slow air current is passed through the solution and at the same time the quantity of sulfuric acid (in the present instance 232,4 kilograms of an acid of 30 per cent), which is required for neutralizing the free ammonia and for decomposing the ammonium thiosulfate and the polysulfide, is added gradually. A slight excess of sulfuric acid, which should not be more than about 0,1 per cent of the volume of the sulfocyanate solution, will do no harm and will expedite the decomposition of the ammonium thiosulfate. The decomposition of the thiosulfate and polysulfide is further expedited by slightly heating the solution, for instance to 40–50° C. As a rule the solution will be heated to about this temperature automatically on the sulfuric acid being added. Compressed air is passed through the solution by means of an acid-proof pipe extending as far as possible into the solution, until the air escaping from the kettle has only a very slight smell of sulphur dioxide.

The sulphur originally in the solution and the sulphur separated therefrom by the decomposition of the sulphur compounds with acid remain in the solution. The ammonium sulfate formed in the reaction is now converted into calcium sulfate and ammonia by adding a corresponding quantity of lime. In order to completely bind 232,4 kilograms of a sulfuric acid of 30 per cent, 44,3 kilograms lime (CaO) in the form of quicklime of 90 per cent are required. The quicklime is slaked with the least possible quantity of water or steam in a well known manner, before introducing it into the solution. After the reaction of the ammonium sulfate with lime has come to an end, ammonia is driven off by heating the solution to about 70° C. and sending a weak air current through it. The escaping ammonia is separated in a well known manner from the waste gases or vapours and converted into ammonium sulfate by washing with sulfuric acid. As the greatest possible quantity of ammonia has been removed from the solution, this latter is separated from the calcium sulfate precipitated therein as well as from sulphur and any other insoluble material present by passing it through a filter, whereupon the solution is concentrated by evaporation to obtain ammonium sulfocyanate.

*Example 2*

1000 litres of a solution of ammonium thiocyanate having a composition as described with reference to Example 1, are heated with or without the aid of an air current in suitable apparatus in order to remove the free ammonia and ammonium polysulfide as far as possible. The solution thus treated, which was at the same time concentrated to a certain extent, now contains 295,0 kilograms $NH_4CNS$, 15,0 kilograms $(NH_4)_2S_2O_3$, 5,0 kilograms so-called "free" $NH_3$, and besides the sulphur originally present as an impurity a further quantity of sulphur formed by the decomposition of the polysulfide. To the solution is now added in the same or a separate apparatus the quantity of sulfuric acid required for decomposing the thiosulfate and for neutralizing the ammonia, in the present case 81,1 kilograms of a sulfuric acid of 30 per cent. As described with reference to Example 1, the sulfuric acid is added only gradually and the decomposition of the thiosulfate is expedited by heating the solution to about 70° and simultaneously passing air through it.

The solution is now treated further as described with reference to Example 1 for the removal of calcium sulfate and ammonia.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The process of recovering ammonium thiocyanate from gas liquor containing other ammonium thio-compounds which comprises treating the solution with sulphuric acid whereby said other ammonium thio-compounds are decomposed, precipitating sulphur compounds formed during said treatment of sulphuric acid and removing insoluble material from the resultant solution.

2. The process of recovering ammonium thiocyanate from a solution thereof containing also other ammonium thio-compounds which comprises treating the solution with sulphuric acid in a current of gas to decompose said other ammonium thio-compounds and remove volatile products of reaction, treating the resultant solution to precipitate other products of reaction with said sulphuric acid and removing insoluble material from said solution.

3. The process of recovering ammonium thiocyanate from a solution thereof containing also other ammonium thio-compounds which comprises treating the solution with sulphuric acid to decompose said other ammonium thio-compounds, removing volatile products of reaction with said sulphuric acid by means of a current of gas, treating the resultant solution to precipitate the non-volatile products of reaction with said sulphuric acid, filtering the solution to remove insoluble material and evaporating the filtered solution to recover ammonium thiocyanate therefrom.

4. In the process of recovering ammonium thiocyanate from a solution thereof containing sulphur impurities, the steps which comprise adding sulphuric acid to decompose said impurities, and merely sufficient calcium hydroxide to precipitate the products of reaction with said sulphuric acid.

5. In the process of recovering ammonium thiocyanate from a solution thereof containing also other compounds of ammonia and sulphur, the steps which comprise treating the solution with sulphuric acid to decompose said other compounds, and then with calcium hydroxide in amount merely sufficient to precipitate the products of reaction with said sulphuric acid.

6. The process of recovering ammonium thiocyanate from a solution thereof containing also other compounds of ammonia and sulphur which comprises treating the solution with sulphuric acid to decompose said other compounds, then treating the solution with lime in amount merely sufficient to precipitate the non-volatile products of reaction thereby produced, and filtering the solution to remove insolubles.

In testimony whereof I affix my signature.

KONRAD KELLER.